Dec. 18, 1923.                                       1,477,857
                    T. S. VIEROW
                 DEPOSITING MACHINE
                 Filed May 19, 1922            2 Sheets-Sheet 2
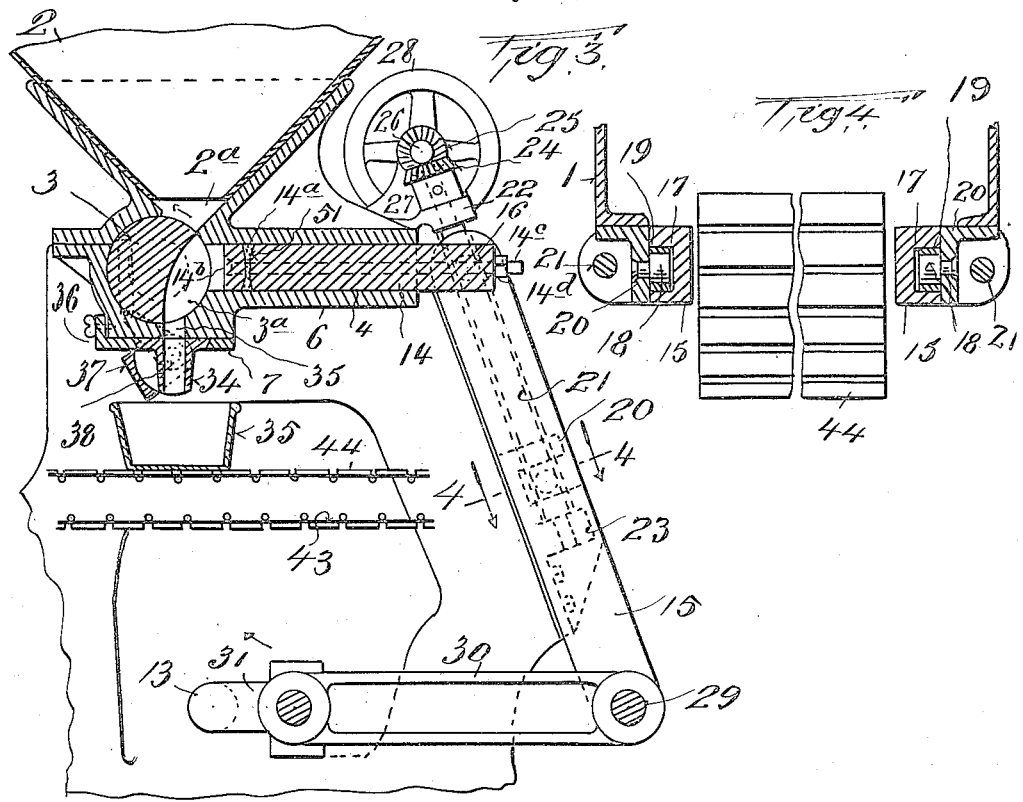
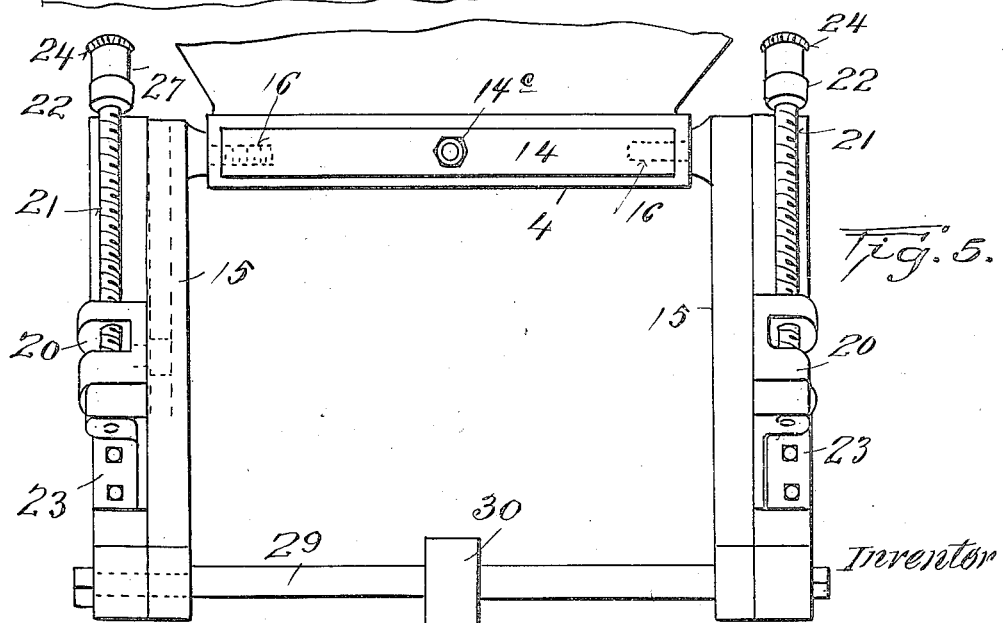
Inventor
T. S. Vierow.
BY HIS ATTORNEY
T. F. Bourne Patented Dec. 18, 1923.

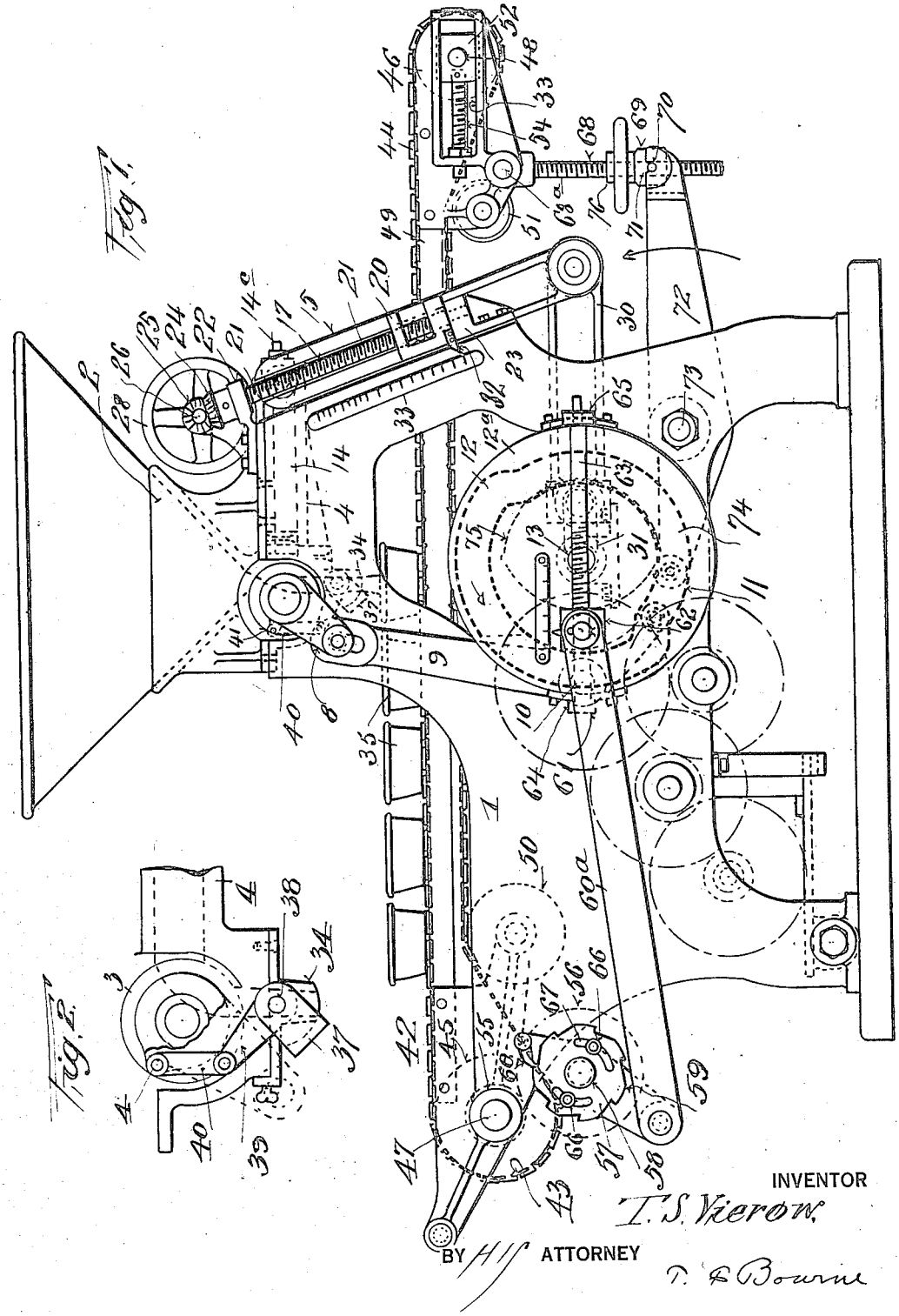

1,477,857

UNITED STATES PATENT OFFICE.

THOMAS S. VIEROW, OF JERSEY CITY, NEW JERSEY.

DEPOSITING MACHINE.

Application filed May 19, 1922. Serial No. 562,031.

*To all whom it may concern:*

Be it known that I, THOMAS S. VIEROW, a citizen of the United States, and resident of Jersey City, in the county of Hudson and State of New Jersey, have invented certain new and useful Improvements in Depositing Machines, of which the following is a specification.

My invention has reference to machines for bakery and confectionery purposes, such as for depositing batter or soft-dough for cakes and analogous articles.

The object of my invention is to provide simple and effective means for scaling and depositing the material in successive batches, whereby to enable the regulation in a simple manner of the volume of the deposits according to the size of the cakes or the like to be produced.

My invention comprises novel details of improvement that will be more fully hereinafter set forth and then pointed out in the claims.

Reference is to be had in the accompanying drawings, forming a part hereof, wherein—

Fig. 1 is a side elevation of a depositing machine embodying my invention;

Fig. 2 is a detail of cut off devices for the deposits;

Fig. 3 is a vertical sectional detail of part of the machine;

Fig. 4 is a cross section on line 4, 4 in Fig. 3; and

Fig. 5 is an end view looking from the right hand side of Fig. 1, parts being omitted.

Similar numerals of reference indicate corresponding parts in several views.

The numeral 1 indicates the main frame of the machine which may be of any suitable construction. At 2 is indicated a hopper, suitably supported by frame 1, adapted to contain the material to be deposited, such as batter, soft dough, or the like. The flow of the material through outlet 2$^a$ of hopper 2 is controlled by valve member 3, shown in the form of a round bar having a recess 3$^a$ extending along one side. Valve member 3 is shown journalled in bearings beneath the hopper and said valve opposes a cylinder 4 supported up the main frame. Cylinder 4 is shown provided between members 5 and 6 which oppose and provide bearings for valve 3, the member 6 being shown provided with outlet 7 for the material to be deposited. Valve 3 is to be rocked to present its recess 3$^a$ alternately in register with hopper 2 and cylinder 4 and with the cylinder and outlet 7. Said valve is shown provided with a crank-arm 8 pivotally connected with a lever 9 that is pivoted upon the main frame at 10 and provided with a projection or roller 11 co-operative with a cam groove 12 in cam member 12$^a$ that is secured upon shaft 13 suitably journalled upon frame 1. During each rotation of cam 12 the valve 3 will be rocked back and forth to receive material from hopper 2 and cut off material therefrom. A plunger or piston 14 is slidable in cylinder 4. Plunger 14 is to be reciprocated with relation to the rocking of valve 3. The length of the stroke of the plunger is to be regulated according to the dimensions of the deposits of material to be made. I have shown piston 14 pivotally connected at its sides near the outer end with spaced arms 15, as by means of pivots 16 connecting said piston with said arms, which arms have adjustable fulcrum points to vary the length of stroke of plunger 14 as desired.

The arms 15 are shown provided in their outer surfaces with longitudinally disposed grooves or guideways 17 in which are located pins 18 shown within blocks 19 slidable in the corresponding grooves 17, which pins are connected with nuts or threaded blocks 20 (Fig. 4). Screws 21 are journalled at opposite ends in bearings in brackets or the like 22, 23, secured, as by screws, to opposite sides of frame 1, which screws operate in the threads of nuts or blocks 20. I provide means to rotate the screws 21 similarly and in unison to correspondingly simultaneously move the nuts 20 with their pins 18 along the arms 15. For such purposes I have shown gears 24 secured on the screws 21 and in mesh with gears 25 secured on transverse shaft 26 journalled in bearings at 27 on frame 1, which shaft is provided with a handwheel or crank 28 for rotating it.

The lower ends of arms 15 are shown connected by a tie-rod 29 that is pivotally connected with a link 30 that is pivotally connected with a crank 31 on shaft 13 to rock the arms 15 (Fig. 3). The nuts 20 will be adjusted along arms 15 by the rotation of screws 21 to determine the positions of the fulcrum points of arms 15, at the pins 18, whereby the length of stroke of plunger 14 will be regulated.

To provide packing at the operating end of plunger 14, I insert a suitable packing strip 14$^a$ between the end of the plunger and a bar 14$^b$, which bar is connected with a screw 14$^c$, which passes through a hole in the plunger and extends beyond its outer end, a locking nut 14$^d$ securing the screw in set position. By operating the screw 14$^c$ the bar 14$^b$ may be forced more or less against packing 14$^a$ to cause the latter to snugly fit in cylinder 4 to provide for proper suction with respect to material in the cylinder.

Valve 3 and plunger 14 are shown in the material discharging or depositing positions in Fig. 3. When valve 3 is rocked in the direction of the arrow in Fig. 3, the groove or recess 3$^a$ of said valve will be presented in register with the hopper outlet 2$^a$ and plunger 14 will move outwardly, whereby material from the hopper will be drawn into cylinder 4. Valve 3 will next return to cut off the outlet 2$^a$ and cause recess 3$^a$ to register with outlet 7, and plunger 14 will advance toward valve 3 to force material from the cylinder through outlet 7 to be deposited, and so on for each operation of valve 3 and plunger 14.

When nuts 20 are in their lowest position, shown in Figs. 1 and 3, plunger 14 will have its greatest stroke to deposit the largest amount of material, and in accordance with the position of nuts 20 above from said lowest position, the extent of rocking of the upper ends of arms 15 by means of crank 31 will be determined for regulating the strokes of plunger 14 in accordance with the quantity of material to be deposited by the plunger. By the means described, I am enabled by the simple operation of rotating the screws 21 to regulate the size of the deposits desired for each operation of the plunger. By means of a pointer 32 on a nut 20 and a corresponding graduated scale 33 on frame 1 (Fig 1), the position of nuts 20 along arms 15 may be determined with respect to various sized deposits to be made.

Any desired nozzle or nozzles 34 may be secured adjacent to outlet 7 to guide the material to pans or other receptacles 35, which nozzles may be replaced, as required, according to the sizes of the desired deposits. The nozzle 34 may be one continuous nozzle for a deposit, or may comprise spaced outlets of desired dimensions for simultaneously depositing several portions of the material or batter, as well known in the art. The nozzle 34 may be retained in place by the stop 35 and screws 36 (Fig. 3).

A cut-off 37 is shown operative below nozzle 34, to oppose and open the outlet of the nozzle. The cutoff 37 is pivotally supported at 38 to rock respecting the nozzle, which cut-off is shown provided with a crank arm 39 connected by a link 40 with a crank pin 41 connected to the valve 3. The relation of the parts is such that when valve 3 is in the position shown in Fig. 3, the cut-off 37 will be at one side of nozzle 34, and when valve 3 is rocked to register its groove or recess 3$^a$ with hopper outlet 2$^a$ the cut-off 37 will be moved to close the outlet of nozzle 34.

The pans 35 are adapted to be supported upon an intermittently movable conveyor or table 42, which is shown in the form of endless chains 43 provided with spaced transverse bars or slats 44 to support the pans. The conveyor is shown mounted upon sprocket wheels 45, 46, carried by shafts 47, 48, supported upon a frame 49 that is journalled at one end upon shaft 47, said shaft being journalled near its ends on frame 1. Frame 49 carries idle wheels 50, 51 bearing against the lower run of the conveyor. Shaft 48 is journalled near its ends in bearing boxes 52 guided in ways 53 on opposite sides of frame 49, which boxes connect with screws 54 journalled at their outer ends on frame 49, whereby said bearing boxes may be adjusted in the ways 53 to provide the desired tension of the conveyor. A pinion 55 is secured on shaft 47 and is in mesh with a gear 56 connected to a ratchet 57 journalled on pin or shaft 58 on frame 1, a lever 59 rockable on pin or shaft 58 being provided with a dog 60 co-operative with ratchet 57. The lever 59 is pivotally connected by a link 60$^a$ with a crank pin 61 shown carried by a nut or threaded block 62 supported upon a screw 63 that is journalled in bearings 64, 65, secured upon cam member 12$^a$. As said cam member is rotated the pin 61 will cause lever 59 to rock, whereby the conveyor will be operated step by step toward the right in Fig. 1, the pans 35 being successively stopped beneath nozzle 34 for each deposit or discharge from said nozzle to be made. The extent of travel of the conveyor for each step thereof is in accordance with the dimensions of the deposit to be made and is controlled by the position of pin 61 respecting shaft 13 as the axis of member 12$^a$. By rotating screw 63, the nut or block 62 will be adjusted radially respecting the axis of member 12$^a$ to increase or diminish the rocking movement of shaft 59. The rachet 57 may be adjusted axially respecting gear 56 by means of screws or nuts 66 on said gear located in arcuate slots 67 in ratchet 57, whereby the position of stopping the conveyor respecting nozzle 34 may be regulated to likewise stop the pans in desired position beneath the nozzle.

Means are provided to successively raise and lower conveyor 43 and frame 49 with respect to nozzle 34, such as by rocking said conveyor upon its shaft 47 as an axis. For such purpose I have shown a screw 68 pivotally connected to the conveyor frame 49 by pivot 68ª, which screw operates through a block 69 having projections 70 situated in recesses 71 in a lever 72 pivotally supported upon frame 1 at 73, the opposite end of said lever being shown provided with a projection or roller 74 to co-operate with a cam 75 secured on shaft 13 (Fig. 1). A nut 76 on screw 67 is adapted to bear against block 69. By rotating said nut upon screw 67 the position of conveyor 43, with respect to nozzle 34, may be regulated, since the position of lever 72 with respect to said nozzle is predetermined. The relation of the parts is such that when a deposit is made in a pan, the lever 72 will raise the conveyor with the pan toward nozzle 34, and when plunger 14 has discharged the material from the nozzle the lever 72 will rock to depress the conveyor and thereby cause the material that may project from the nozzle to be broken away from the nozzle.

It will be noted that the cylinder 4 and plunger 14 are horizontally disposed with respect to the hopper, which has the advantage of not requiring the material from a hopper to be elevated by the plunger on its outward stroke, hence such material is not resisted by gravity, and the quantity of material drawn at each outward stroke of the plunger is accurate, so that dependence may be had that the deposits will be uniform to within sufficiently accurate requirements.

While I have shown two arms 15 with corresponding pins 18, nuts 20 and screws 21, it will be understood that I may provide a single arm 15 with its corresponding pin, nut and screw preferably located centrally with respect to plunger 14.

Having now described my invention what I claim is:

1. A depositing machine comprising a hopper, a cylinder, valve means between the hopper and cylinder, a plunger in the cylinder, an arm pivotally connected with and depending from the plunger, a fulcrum for the arm below the plunger, means to operate the arm. and means to adjust said fulcrum along the arm relatively to the plunger.

2. A depositing machine comprising a hopper, a cylinder, valve means between the hopper and cylinder, a plunger in the cylinder, an arm pivotally connected with and depending from the plunger, a fulcrum pin below the plunger adjustable along said arm, means to adjust the position of said pin with respect to said plunger and retain the pin in set position, and means connected with the arm below the fulcrum pin to rock said arm.

3. A depositing machine comprising a hopper, a cylinder, valve means between the hopper and cylinder, a plunger in the cylinder, an arm pivotally connected with and depending from the plunger, a nut having a fulcrum pin co-operative with said arm, a screw extending in the direction of the arm to operate said nut, means movably and slidably connecting said pin with said arm, and means below the pin to rock said arm.

4. A depositing machine comprising a hopper, a cylinder, valve means between the hopper and cylinder, a plunger in the cylinder, an arm pivotally connected with the plunger, said arm having a groove, a fulcrum pin slidably operative in said groove, a nut carrying said pin, a screw to operate said nut to move the pin along the groove, and means to rock said arm.

5. A depositing machine comprising a hopper, a cylinder, valve means between the hopper and cylinder, and provided with an outlet, a plunger in said cylinder, arms pivotally connected to opposite sides of and depending from said plunger, fulcrums for said arms, means to adjust said fulcrums to correspondingly different positions toward and from the plunger, and means connected to said arms below said fulcrums to simultaneously similarly rock said arms.

6. A depositing machine comprising a hopper, a cylinder, valve means between the hopper and cylinder, and provided with an outlet, a plunger in said cylinder, arms pivotally connected to opposite sides of said plunger, and provided with longitudinal grooves, pins adjustably connected to said arms, and slidable in said grooves, nuts carrying said pins, screws to actuate said nuts, means to rotate said screws simultaneously, and equally to similarly adjust the nuts and pins along the arms, and means to rock said arms.

THOMAS S. VIEROW.